United States Patent [19]

Duncan

[11] Patent Number: 4,582,753
[45] Date of Patent: Apr. 15, 1986

[54] POLYMER LAMINATE POSSESSING AN INTERMEDIATE WATER VAPOR TRANSMISSION BARRIER LAYER

[75] Inventor: Gary L. Duncan, Fairport, N.Y.

[73] Assignee: Mobil Oil Corporation, New York, N.Y.

[21] Appl. No.: 754,051

[22] Filed: Jul. 11, 1985

[51] Int. Cl.⁴ .............................................. B32B 3/26
[52] U.S. Cl. .............................. 428/317.9; 428/313.3; 428/315.5; 428/323; 428/910
[58] Field of Search ............... 428/313.3, 313.5, 313.9, 428/314.4, 314.8, 315.5, 315.7, 315.9, 316.6, 317.9, 323

[56] References Cited

U.S. PATENT DOCUMENTS 4,377,616 3/1983 Ashcraft et al. ................. 428/315.7
4,496,620 1/1985 Park et al. ........................... 428/910

*Primary Examiner*—William J. Van Balen
*Attorney, Agent, or Firm*—Alexander J. McKillop; Michael G. Gilman; Charles J. Speciale

[57] ABSTRACT

An opaque barrier layer which comprises:

(a) at least one thermoplastic polymer matrix substrate layer within which is located a strata of voids; positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void; the population of voids in said substrate and the thickness of said substrate being such as to cause a degree of opacity of less than 70% light transmission; and, (b) at least one thermoplastic water vapor transmission barrier layer affixed to said thermoplastic substrate layer.

14 Claims, No Drawings

4,582,753

POLYMER LAMINATE POSSESSING AN INTERMEDIATE WATER VAPOR TRANSMISSION BARRIER LAYER

BACKGROUND OF THE INVENTION

This invention relates to polymer films; and in particular, to laminated polymer films possessing water vapor transmission barrier capability.

U.S. Pat. No. 4,377,616, the contents of which are incorporated by reference herein, discloses an opaque biaxially oriented polymer film structure comprising a thermoplastic polymer matrix core layer possessing numerous voids, a substantial number of which contain at least one spherical void-initiating particle, and transparent skin layers adhering to the surfaces of the core layer. The unique structure of the core layer imparts a much higher degree of opacity, possibly due to the effects of light scattering, than that possible by the use of opacifying pigment alone.

There is no suggestion, however, in U.S. Pat. No. 4,377,616 of incorporating the film structure disclosed therein in a laminate possessing a water vapor transmission barrier layer.

SUMMARY OF THE INVENTION

In accordance with the subject invention, an opaque biaxially oriented polymer film laminate of lustrous satin appearance and possessing a water vapor transmission barrier layer is provided which comprises:

(a) at least one thermoplastic polymer matrix substrate layer within which is located a strata of voids; positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void; the population of voids in said substrate and the thickness of said substrate being such as to cause a degree of opacity of less than 70% light transmission; and, (b) at least one thermoplastic water vapor transmission barrier layer affixed to said thermoplastic substrate layer.

The process for preparing the foregoing polymer laminate comprises:

mixing a first thermoplastic polymeric material with a second material incompatible with said first material to form a substrate mixture, said second material being of a higher melting point or having a higher glass transition temperature than said first material;

heating the substrate mixture to a temperature at least above the melting point of said first material;

dispersing said second material uniformly throughout the molten first material in the form of microspheres;

extruding the substrate mixture in the form of a substrate layer;

affixing at least one thermoplastic water vapor transmission barrier layer to said substrate layer; and, biaxially orienting the resulting laminate film structure at a temperature and to an extent to form opacifying voids in said substrate layer so as to optimize the degree of opacity, enhance the physical characteristics and impart a lustrous satin appearance to said film structure.

DESCRIPTION OF THE PREFERRED EMBODIMENTS

In preparing the thermoplastic polymer substrate layer (a) of the laminate of the present invention, it is preferred that the average diameter of the void-initiating particles be from about 0.1 to about 10 microns. These particles should be spherical in shape so as to initiate a void of unusual regularity and orientation in a stratified relationship throughout the thermoplastic polymer maxtrix material after biaxial orientation of the system. This does not mean that every void is the same size. It means that, generally speaking, each void tends to be of like shape even though it may vary in its dimensions from those of other voids because all of the voids are initiated by a spherical particle. Ideally, the voids assume a shape defined by two opposed and edge-contacting concave disks.

Optimum characteristics of opacity and satin-like appearance are obtained when the two average major void dimensions are greater than about 30 microns.

The void-initiating particle material should be incompatible with the substrate material, at least at the temperature of biaxial orientation.

The substrate has been described above as being a thermoplastic polymer matrix material within which is located a strata of voids. From this it is to be understood that the voids create the matrix configuration. The term "strata" is intended to convey the understanding that there are a large number of voids creating the matrix and the voids themselves are oriented so that the two major dimensions are aligned in correspondence with the direction of orientation of the polymeric film structure. After each void has been formed through the initiation of one or more spherical particles, the particle(s) may contribute little else to the system. This is because its refractive index can be close enough to that of the matrix material that is makes no contribution to opacity. When this is the case, the opacity is principally a function of the light scattering affect which occurs because of the existence of the voids in the system. The opacity of the system can be somewhat enhanced by the inclusion therein of an opacifying pigment dispersed throughout. A particularly preferred proportion of pigment in this layer can be from about 1 to about 3% by weight of the core. The pigment material is present in such a particle size and shape that is does not, at least in any material sense, contribute any void initiation by itself. The optional presence of the opacifying pigment contributes perhaps 3 to 8% to the degree of opacity of the system.

A typical void of the substrate is defined as having major dimensions X and Y and minor dimension Z, where dimension X is aligned with machine direction orientation, dimension Y is aligned with transverse direction orientation and dimension X approximately corresponds to the cross-sectional dimension of the spherical particle which initiated the void.

It is a necessary part of the present invention that orientation conditions be such that the X and Y dimensions of the voids of the substrate be major dimensions in comparison to the Z dimension. Thus, while the Z dimension generally approximates the cross-sectional dimension of the spherical particle initiating the void, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction stretching, the temperature conditions must be such as to permit these major dimensions to form without any destruction of the voids in any of its dimensions. The voids are particularly vulnerable to destruction during sequential orientation if the stretching temperature is too low. Even in simultaneous orientation if the temperature is too low, the stretching forces will tend to cause internal shredding and void splitting. This leads to a complete loss of control over the integrity of the individual closed voids, and the consequent integrity of the matrix polymer. Thus, one skilled in the art, following the present general guidelines can orient at a temperature and to a degree which will yield X and Y dimensions approaching a maximum without causing at least any substantial splitting, shredding or overall lack of void and matrix integrity.

By way of illustration, room temperature biaxial orientation of a polypropylene matrix layer (a) containing nylon spheres of the size and amount contemplated herein will not produce the claimed structure. Either void splitting will occur or voids of insignificant size will result. Polypropylene must be oriented at a temperature which happens to be significantly higher than its glass transition temperature. The temperature conditions must permit X and to be at least several multiples of the Z dimension without void splitting at least to any significant degree. If this is accomplished, optimum physical characteristics, including low water vapor transmission rates and a high degree of light scattering, are obtained without void splitting or film fibrillating.

As indicated above, the matrix polymer and the void initiating particle must be incompatible and this term is used in the sense that the materials are two distinct phases. The spherical void initiating particles constitute a dispersed phase throughout the lower melting polymer which polymer will, ultimately, upon orientation, become a void filled matrix with the spherical particles positioned somewhere in the voids.

As a result of the biaxial orientation of the film structure described therein, in addition to opacifying the substrate layer of the structure, the orientation improves other physical properties of the composite layers such as, flex-cracking resistance, Elmendorff tear strength, elongation, tensile strength, impact strength and cold strength properties. In addition to this, an extraordinary, rich looking, lustrous satin appearance is imparted to substrate layer (a). This appearance is not seen in the absence of water vapor transmission barrier layer (b) or if barrier layer (b) is too thin or otherwise substantially reveals the surface imperfections of substrate layer (a).

It is believed that because of the comparative sphericity of the void-initiating particles, the voids are closed cells. This means that there is virtually no path open from one side of the substrate to the other through which liquid or gas can traverse.

The void-initiating particles can be organic or inorganic so long as they are spherical in shape and within the preferred particle size range so as to initiate the formation of a void, which in a significant number of cases, has a lens-like shape, that is, a lens of the biconvex shape. When a polymeric material is contemplated as the void-initiating particle, it can be a polymer which is co-melted with the polymer of the matrix or substrate. In this case, it is necessary for it to have a sufficiently higher melting point than the core polymer and be incompatible and capable of assuming a dispersed phase of small spherical particles as the temperature of the co-melted mix is reduced. It is also contemplated that the void initiating particles can be preformed and then uniformly dispersed into a melt of, e.g., polypropylene. This has the advantage of not having to subject the matrix polymer layer (b) to the temperature of a much higher melting polymer. In this manner, any thermal degradation of the matrix polymer is avoided.

It is believed that because of the number, the shape and the orientation strata-wise of matrix voids, a significantly enhanced light scattering effect is obtained. This effect is further enhanced or magnified by the use of the water vapor transmission barrier layer (b) described below.

It is important that a particular thickness relationship exist between the thickness dimension or the substrate layer (a) and the thickness dimension of water vapor transmission barrer layer (b). It is preferred that the substrate thickness be from about 30 to about 85% of the overall structure. This, in combination with the population and configuration of the voids in a structure at least about 0.5 mils thick, will materially contribute to the overall degree of opacity of the structure. Likewise, by maintaining the barrier layer thickness within a particular range in relation to the overall structure and to the thickness of the substrate layer, the overall combination results in a lustrous satin appearance. It is preferred that the barrier layer thickness (or combined barrier layer thickness where such a layer is affixed to both surfaces of the substrate layer) be about 15 to about 70% of the overall film structure. It is important that the barrier layer be sufficiently thick so that the outer surface thereof does not manifest the irregularities or surface projections of the substrate layer material. If this were not the case, the lustrous appearance of the satin finish would be materially lessened.

When preformed spheres are employed, it is the shape and size of the sphere that is important rather than the chemical nature of the material, per se. Thus, solid or hollow organic or inorganic spheres of any type can be employed. Interesting effects can be achieved by the use of spheres of different colors. Since statistically each void has approximately one sphere somewhere within the void, interesting and pleasing color and/or reflectance effects can be imparted to the overall layer structure by the use of spheres of different color absorption or reflectance. The light scattered in a particular void is additionally either absorbed or reflected by the void initiating sphere and a separate color contribution is made to the light scattering in each void.

Examples of thermoplastic resins which can be used as the dispersed phase within the matrix material are the polyamides or nylons of commerce, certain polyesters such as polyethylene terephthalate acetals, acrylic resins, etc. Inorganic materials which are useful as void initiating particles include solid or hollow preformed glass spheres, metal beads or spheres, ceramic spheres, etc. In fact, any material which can be formed into spheres without causing thermal degradation to the substrate material is contemplated.

By the technique of the present invention, light transmission through the laminate of this invention can be reduced to as low as about 16%. This would be true in a film having an overall thickness of at least 1.5 mils where the substrate layer is at least 60% and the barrier layer(s) is 20%.

While the preferred particle size of the sphere is from about 0.1 to about 10 microns, it is particularly preferred that the particle size range from about 0.75 to about 2 microns. The void initiating particles can be present in up to about 20% by weight of substrate layer (a) prior to orientation, a preferred range being from 2 to about 7 percent by weight.

For convenience and more precise control of the formulation and character of the substrate layer, a master batch technique can be employed either in the case of forming the spherical particles in situ or in adding preformed spheres to the molten thermoplastic matrix material from which substrate layer (a) will be formed. After preparation of a master batch, appropriate dilution of this system can be accomplished by adding additional thermoplastic matrix material until the desired proportions are obtained.

It is preferred that the substrate material and the barrier material be coextruded. Thereafter, biaxial orientation is carried out to an extent and at a temperature calculated to obtain the maximum degree of opacity without any significant sacrifice in the physical characteristics, including appearance, of the resulting laminate film structure. Obviously, as the materials employed change, the conditions of biaxial orientation will change. By way of exemplification when employing nylon-6 as the void initiating spheres, a machine direction orientation of from 4 to 8 times and a transverse direction orientation of from about 4 to 8 times, at a drawing temperature of from 100° C. to 160° C. to yield a biaxially oriented film of from 0.7 to 3 mils of overall thickness can be obtained.

The thermoplastic water vapor transmission barrier layer (b) can be fabricated from a wide variety of resins, the poly-alpha-olefins such as polyethylene, polypropylene, polyethylene-polypropylene copolymer, and the like, being preferred. Of these, isotactic polypropylene is especially preferred. Thickness of this layer can vary, e.g., from about 2 to 10 microns, and is preferably in the range of about 4 to 6 microns. Barrier layer (b) contains a hygroscopic particulate or microfibrous material in an amount sufficient to impart effective water vapor absorbent capability to the resin. Thus, for example, from about 5 to 40 weight parts, and preferably from about 10 to 30 weight parts, of hygroscopic material having an average diameter of from about 0.5 to 5 microns or so (depending on the thickness of layer (b)) can be uniformly incorporated into the resin comprising layer (b) prior to its extrusion. If desired, these materials can be pretreated with chemical coupling agents, e.g., silane or titanate type coupling agents, in a known manner to enhance the adhesion of the materials to the resin in which they are incorporated. Suitable hygroscopic materials include any of a large variety of organic and inorganic substances which are known to absorb water vapor due to physical and/or chemical affinity for water, e.g., diatomaceous earth, dehydrated inorganic salts and hydroxides, dried highly pulverized clays, talcs, silica gels, water-absorbent cellulosics, nylon-type polymers, ethylene-vinyl alcohol copolymer, ethylene-vinyl acetate-vinyl alcohol terpolymer having a relatively high vinyl alcohol content, and so forth. Alternatively, barrier layer(b) may be fabricated entirely from a hygroscopic thermoplastic film forming resin such as the aforementioned ethylene-vinyl alcohol copolymer and ethylene-vinyl acetate-vinyl alcohol terpolymer. Optionally, barrier layer (b) can contain an opacifying pigment in conventional amounts uniformly distributed therein.

In order to enhance the cohesiveness and adherence of substrate layer (a) to barrier layer (b), known and conventional adhesive resins can be employed. For example, the CXA resins available from DuPont (Wilmington, Del.), a series of coextrudable adhesive resins for multilayer resin films, can be advantageously employed for this purpose.

It is also within the scope of the present invention to prove substrate layer (a) with a transparent and/or pigmented skin layer (c) as is known from U.S. Pat. No. 4,377,616, supra. In general, such a layer will be much like that of barrier layer (b) excpet for lacking a hygroscopic component or capability.

In keeping with the invention, a number of different laminate arrangements can be provided as illustrated in the following table.

TABLE

| | VARIOUS LAMINATE STRUCTURES | | | | | | |
|---|---|---|---|---|---|---|---|
| LAMINATE | LAYER 1 | LAYER 2 | LAYER 3 | LAYER 4 | LAYER 5 | LAYER 6 | LAYER 7 |
| 1 | substrate layer (a) | barrier layer (b) | — | — | — | — | — |
| 2 | barrier layer ($b_1$) | substrate layer (a) | barrier layer ($b_2$) | — | — | — | — |
| 3 | transparent or pigmented layer (c) | substrate layer (a) | barrier layer (b) | — | — | — | — |
| 4 | transparent or pigmented skin layer (c) | substrate layer ($a_1$) | barier layer ($b_1$) | substrate layer ($a_2$) | barrier layer ($b_2$) | — | — |
| 5 | transparent or pigmented skin layer ($c_1$) | substrate layer ($a_1$) | barrier layer (b) | substrate layer ($a_2$) | transparent or pigmented skin layer ($c_2$) | — | — |
| 6 | barrier layer ($b_1$) | substrate layer ($a_1$) | barrierr layer ($b_2$) | substrate layer ($a_2$) | barrier layer ($b_3$) | — | — |
| 7 | transparent or pigmented skin layer ($c_1$) | substrate layer ($a_1$) | transparent or pigmented skin layer ($c_2$) | barrier layer (b) | transparent or pigmented skin layer ($c_3$) | substrate layer ($a_2$) | transparent or pigmented skin layer ($c_4$) |

The following examples are illustrative of polymer laminates of the present invention.

EXAMPLE 1

This example provides Laminate No. 2 of the above Table, i.e., a three-layer laminate in which substrate layer (a) is interposed between two water vapor transmission barrier layers ($b_1$) and ($b_2$).

A mixture of isotactic polypropylene (93 parts, MP 160° C. and a melt index of 4.5) and nylon-6 (7 parts, MP 225° C.) from which substrate layer (a) is to be formed is melted in an extruder provided with a screw of L/D ratio of 20/1. A second extruder in association with this first mentioned extruder is supplied with the same polypropylene without the nylon-6 present but filled with 20 weight parts of uniformly distributed diatomaceous earth particles (average particle size of about 2 microns) and serving as the resin from which barrier layers ($b_1$) and ($b_2$) are to be formed. A melt coextrusion is carried out while maintaining the cylinder of substrate material (a) at a temperature ranging from 190° to 220° C. The polypropylene to be extruded as barrier layers ($b_1$) and ($b_2$) is maintained at a temperature of from 190° to 220° C. A film structure is coextruded with a substrate thickness 40% of the total extruded thickness. The barrier layers are approximately 30% of the total thickness. The unoriented film measures approximately 40 mils in thickness. This sheet is subsequently oriented seven by seven and one-half times using a commercially available sequential biaxially orienting apparatus. The MD orientation temperature is about 105° C. and the TD orientation 135° C. The resulting 1.9 mil film has an opacity of 20% transmission and a 45° gloss of 120%.

EXAMPLE 2

This example provides Laminate No. 7 of the above Table, i.e., a seven-layer laminate in which a barrier layer (b) is interposed between two three-layer laminate structures in which both surfaces of a substrate layer are affixed to transparent skin layers as in U.S. Pat. No. 4,377,616.

The coextrusion procedure of Example 1 is followed except that the second extruder is supplied with uncompounded polypropylene (at an extruder temperature of about 220° C.) from which each of two transparent skin layers will be formed and a third extruder is arranged to provide the barrier layer. Melt coextrusion of the three polymer streams is carried out to form the foregoing seven-layer laminate of about 40 mils thickness. In the resulting film structure, opacifying substrate layers ($a_1$) and ($a_2$) together represent about 50% of the total extruded thickness, skin layers ($c_1$) to ($c_4$) make up 30% of this thickness and barrier layer (b) constitutes the remaining 20% of the laminate thickness.

EXAMPLE 3

The same procedure as in Example 1 is followed but to provide five-layered Laminate No. 4 of the above Table. Omitting transparent skin layers ($c_2$) and ($c_3$) of Laminate No. 7 puts all of the skin resin on the outer layers of the structure thereby enhancing the stiffness of the laminate.

EXAMPLE 4

Following substantially the same procedures as previously described, five layered Laminate No. 6 is provided. In addition, each of the barrier layers is provided with about 5% by weight of titanium dioxide pigment to further augment opacity. The resulting arrangement of three alternating barrier layers ($b_1$) to ($b_3$) presents multi-stage water vapor transmission barrier capability for even more effective barrier properties.

EXAMPLE 5

Example 3 is substantially repeated except that skin layers ($c_2$) and ($c_3$) are loaded with about 5% by weight of sodium carbonate to enhance opacity. The exposed surface of skin layer ($c_2$) is corona treated in a known and conventional manner to improve its printability.

What is claimed is:

1. An opaque barrier layer which comprises:
    (a) at least one thermoplastic polymer matrix substrate layer within which is located a strata of voids;
       positioned at least substantially within at least a substantial number of said voids is at least one spherical void-initiating particle which is phase distinct and incompatible with the matrix material, the void space occupied by said particle being substantially less than the volume of said void, with one generally cross-sectional dimension of said particle at least approximating a corresponding cross-sectional dimension of said void; the population of voids in said substrate and the thickness of said substrate being such as to cause a degree of opacity of less than 70% light transmission; and,
    (b) at least one thermoplastic water vapor transmission barrier layer affixed to said thermoplastic substrate layer.

2. The polymer laminate of claim 1 wherein in said substrate layer (a), the spherical particles are an inorganic material.

3. The polymer laminate of claim 1 wherein in said substrate layer (a), the spherical particles are an organic material.

4. The polymer laminate of claim 3 wherein said organic material is a polymer.

5. The polymer laminate of claim 1 wherein said substrate layer (a) is coextruded with said barrier layer (b).

6. The polymer laminate of claim 1 wherein the substrate thickness is from about 30 to about 85% of said structure.

7. The polymer laminate of claim 1 wherein said barrier layer (b) is of the same polymeric material as said substrate material (a).

8. The polymer laminate of claim 1 further possessing at least one skin layer (c) affixed to substrate layer (a).

9. The polymer laminate of claim 8 wherein substrate layer(s) (a), barrier layer(s) (b) and skin layer(s) (c) are the same polymeric material.

10. The polymer laminate of claim 1 wherein barrier layer (b) contains from about 5 to about 40 weight parts of hygroscopic material uniformly distributed therein.

11. The polymer laminate of claim 10 wherein barrier layer (b) contains from about 10 to about 30 weight parts of hygroscopic material uniformly distributed therein.

12. The polymer laminate of claim 10 wherein the hygroscopic material is diatomaceous earth, dehydrated salt or hydroxide, dried highly pulverized clay, talc, silica gel, water absorbent cellulosic, water absorbent polyamide, ethylene-vinyl alcohol copolymer or ethylene-vinyl acetate-vinyl alcohol terpolymer.

13. The polymer laminate of claim 1 wherein barrier layer (b) is fabricated from a water absorbent polymer containing 0 to 40 weight parts of hygroscopic material uniformly distributed therein.

14. The polymer laminate of claim 13 wherein barrier layer (b) is fabricated from ethylene-vinyl alcohol copolymer.

* * * * *